(12) United States Patent
Chaffee et al.

(10) Patent No.: US 10,300,638 B2
(45) Date of Patent: May 28, 2019

(54) PROCESS FOR IMPROVED COMPOSITE BOARD MANUFACTURE

(71) Applicant: Solenis Technologies, L.P., Schaffhausen (CH)

(72) Inventors: Timothy L. Chaffee, Sauk City, WI (US); Daniel F. Varnell, Wilmington, DE (US)

(73) Assignee: SOLENIS TECHNOLOGIES, L.P., Schaffhausen (CH)

( * ) Notice: Subject to any disclaimer, the term of this patent is extended or adjusted under 35 U.S.C. 154(b) by 150 days.

(21) Appl. No.: 15/441,303

(22) Filed: Feb. 24, 2017

(65) Prior Publication Data
US 2017/0252950 A1    Sep. 7, 2017

Related U.S. Application Data

(60) Provisional application No. 62/301,778, filed on Mar. 1, 2016.

(51) Int. Cl.

| | | |
|---|---|---|
| *B27N 1/00* | (2006.01) | |
| *B27N 1/02* | (2006.01) | |
| *B27N 3/00* | (2006.01) | |
| *C08L 97/02* | (2006.01) | |
| *B29C 43/00* | (2006.01) | |
| *B29C 43/02* | (2006.01) | |
| *B29C 43/52* | (2006.01) | |
| *C09J 189/00* | (2006.01) | |
| *C08L 89/00* | (2006.01) | |
| *B29K 1/00* | (2006.01) | |
| *B29L 7/00* | (2006.01) | |

(52) U.S. Cl.
CPC .......... *B29C 43/003* (2013.01); *B27N 1/0209* (2013.01); *B27N 3/002* (2013.01); *B29C 43/02* (2013.01); *B29C 43/52* (2013.01); *C08L 89/00* (2013.01); *C08L 97/02* (2013.01); *C09J 189/00* (2013.01); *B27N 1/003* (2013.01); *B29K 2001/08* (2013.01); *B29L 2007/00* (2013.01)

(58) Field of Classification Search
None
See application file for complete search history.

(56) References Cited

U.S. PATENT DOCUMENTS

| | | |
|---|---|---|
| 3,239,408 A | 3/1966 | Meyer et al. |
| 4,183,997 A | 1/1980 | Stofko |
| 4,525,164 A | 6/1985 | Loeb et al. |
| 4,654,259 A | 3/1987 | Stofko |
| 5,523,293 A | 6/1996 | Jane et al. |
| 6,214,265 B1 | 4/2001 | Rosthauser et al. |
| 6,235,815 B1 | 5/2001 | Loercks et al. |
| 7,060,798 B2 | 6/2006 | Li et al. |
| 7,252,735 B2 | 8/2007 | Li |
| 7,960,452 B2 | 6/2011 | Khabbaz et al. |
| 8,901,208 B2 | 12/2014 | Jackson et al. |
| 2006/0142433 A1* | 6/2006 | Rivers ............ C08L 97/02 524/17 |
| 2011/0100256 A1 | 5/2011 | Anderson et al. |
| 2013/0005867 A1 | 1/2013 | Varnell |
| 2013/0202905 A1 | 8/2013 | Blount |

FOREIGN PATENT DOCUMENTS

| | | |
|---|---|---|
| BE | 874584 | 2/1979 |
| GB | 976491 | 11/1964 |
| WO | WO 2009/048598 | * 4/2009 |

* cited by examiner

Primary Examiner — Mary Lynn F Theisen
(74) Attorney, Agent, or Firm — Lorenz & Kopf, LLP

(57) ABSTRACT

The invention is directed to a process for the manufacture of composite wood structures, which provides for increased production rates and machinability. More particularly, the process comprises combining wood particles with a composition comprising an aqueous protein and diluent dispersion.

14 Claims, No Drawings

PROCESS FOR IMPROVED COMPOSITE BOARD MANUFACTURE

This application claims the benefit of U.S. provisional application number 62/301,778, filed 1 Mar. 2016, the entire contents of which are hereby incorporated by reference.

BACKGROUND OF THE INVENTION

The invention is directed to a process for the manufacture of composite wood structures, which provides for improved machinability. More particularly, the process comprises combining wood particles with a composition comprising an aqueous protein and diluent dispersion, followed by molding or compressing the combination of wood particles and reactive mixture that allows for better manufacturing and increased efficiency.

Lignocellulosic based composites, such as interior plywood, medium-density fiberboard (MDF), particle board (PB), waferboard and oriented strandboard, are prepared from combinations of a lignocellulosic such as wood, and a binder or binders, also known as resins and adhesives. Composite materials such as oriented strandboard, particle board and flake board are generally produced by blending or spraying lignocellulose materials such as wood flakes, wood fibers, wood particles, wood wafers, strips or strands, pieces of wood or other comminuted lignocellulose materials with a binder composition while the comminuted materials are blended by tumbling or agitating them in a blender, a blow-line or like apparatus. After blending sufficiently to form a uniform mixture, the materials are formed into a loose mat, which is compressed, for example, between heated platens or plates or steel belts to set the binder and bond the flakes, strands, strips, pieces, etc. together in densified form. Conventional processes are generally carried out at temperatures of from about 150° C. to 225° C. in the presence of varying amounts of steam generated by liberation of entrained moisture from the wood or lignocellulose materials. These processes also generally require that the moisture content of the lignocellulose material be between about 2 and about 35% by weight, before it is blended with the binder.

Binder or adhesive compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives-Research, Applications and Needs" held in Madison, Wis. on Sep. 23-25, 1980, in which the advantages and disadvantages of each of these different types of binders are discussed. Historical and more recent protein based adhesives are water based. Various water based adhesives are described in numerous books, articles, and patents. See for example patents describing soy flour based adhesives (such as U.S. Pat. Nos. 7,060,798 and 7,252,735), urea formaldehyde (UF) based adhesives, melamine urea formaldehyde (MUF) adhesives, melamine formaldehyde (MF) adhesives, phenol formaldehyde (PF) adhesives, and poly(vinyl acetate) and poly(ethylene vinyl acetate) adhesives.

Generally, the adhesive comprises a phenol-formaldehyde (PF) resin. Another commonly used resin is a liquid polymeric 4,4'-methylene-bis(phenyl isocyanate) (pMDI). Although aqueous, alkaline phenol-formaldehyde resins show good durability, relatively low cost and relatively low toxicity, they are known to exhibit slower press times and, in general, produce products with higher thickness swell properties than the same products composed of a pMDI binder. Although isocyanate resins can exhibit some enhanced performance, they are more costly than PF resins. An additional drawback to production in manufacturing plants or mills is the huge capital costs associated with the press and associated equipment, including steam generation equipment which provides the heat during the pressing process.

Following the pressing process, the lignocellulosic composite undergoes machining steps which may include cutting, trimming, routering, and/or sanding. Lignocellulosics made with pMDI binder, in particular, are known to produce board products that are difficult to machine as experienced by such things as wear on saw blades, router blades or sander belts, or quality defects on the cut edge or sanded surface.

U.S. Patent Application No. 2013/0005867 A1, describes soy-based adhesives have also been used in composite board manufacture. These include such as, soy flour, soy protein concentrates (SPC), or soy protein isolates (SPI) as the starting material. For simplicity, the present disclosure refers to all soy products that contain greater than 20% carbohydrates as "soy flour". Soy flour is less expensive than SPI, but also contains high levels of carbohydrates, requiring more complex crosslinking techniques, as crosslinking results in the much improved water resistance of the soy-based adhesives.

Adhesives comprising starches and protein components, such as soy, are described in references such as, U.S. Pat. Nos. 5,523,293, 6,235,815, U.S. Patent Application 2011/0100256, U.S. Patent Application 2013/202905, U.S. Pat. No. 7,960,452 discloses an adhesive made from plant protein and starch and still other references describe sugars or starches being reacted with urea, phenol or sulfite liquor, U.S. Pat. No. 4,525,164 and BE Patent No. 874584.

U.S. Pat. No. 6,214,265 B1, describes a composition for bonding solid lignocellulosic materials. Suitable binder formulations are based on the reactive mixture of an isocyanate and a carbohydrate material. These are both effective and inexpensive, and eliminate health hazards associated with the use of formaldehyde. Carbohydrate materials include, for example, sugars and starches, in the presence or absence of other active materials. These carbohydrates are mixed with a liquid diisocyanate and applied to the wood, which is then pressed to form a composite product.

In some areas of composite board manufacture sugars have been used as extenders or additives, with molasses and starch being named in a laundry list of carbohydrates, GB Patent No. 976491, U.S. Pat. Nos. 3,239,408, 5,905,115

U.S. Pat. No. 8,901,208 B1, describe a composite board made with a bioresin such as protein-based soybean or carbohydrate-derivative from cellulose or starch; and/or a low formaldehyde or formaldehyde free binder. The binder may in-part be based on a reducing sugar or aldehyde containing sugars.

U.S. Pat. No. 4,183,997, describes the bonding of lignocellulosic material by reacting sugars, starches or both in the presence of a catalyst capable of transforming the sugars and starches into a solid, insoluble in water, and an alkaline buffering agent. However, soy flour is not mentioned.

U.S. Pat. No. 4,654,259, describes bonding wood surfaces together using a bonding composition comprising one or more sugars and an aminoplast. Also described is adhesives based on carbohydrates, such as starches and sugars, which are converted to binders by various means.

There is still a need to produce composite board that provides for improved tool wear and edge quality while maintaining acceptable physical and quality standards of the final product. Using the current composition in the manufacture of composite structures may allow for increased production rates by allowing for quicker cutting and trimming of the composite and may provide for decreased down time due to replacing blades.

BRIEF SUMMARY OF THE INVENTION

The current invention is directed to a process of manufacturing lignocellulosic composite board that provides for improved tool wear and edge quality while maintaining acceptable physical and quality standards. The current process involves a lignocellulosic source wherein an aqueous protein and diluent dispersion is added to the lignocellulosic material, and adding an adhesive, binder or curative, prior to, simultaneously with or subsequent to the aqueous protein and diluent dispersion or a combination thereof, making a composite mixture and forming the composite mixture into a loose mat followed by pressing and curing applications.

More particularly, the current process incorporates an aqueous protein and diluent dispersion wherein the diluent is in the form of starch and sugars and wherein the ratio of starch to soy is about 1:1 to 0:1; and can be about 0.1:1 to about 2:1 starch to protein and the ratio of sugar to the soy plus starch can be about 0.5 parts sugar to about 1 part (soy plus starch) to about 2 parts sugar to about 1 part (soy plus starch), into a mixture of lignocellulosic material. The protein can be a soy product and the sugar can be molasses. Adhesives, binders and/or curatives, such as pMDI, used in the specific manufacturing mill, are also added to the composite mixture and the composite mixture formed into a mat, and the mat pressed and cured. The adhesives can be added to the lignocellulosic mixture prior to, during or subsequent to the addition of the aqueous protein and diluent dispersion or a combination thereof.

DETAILED DESCRIPTION

A process for improved machinability of a composite board is provided wherein an aqueous protein and diluent dispersion is added to a lignocellulosic mixture for producing composites, prior to, simultaneously with; or after adding an adhesive, binder or curative typically used in the mill or can be added in a combination thereof.

In one aspect, the process relates to providing a lignocellulosic source that is broken down into smaller pieces using, for example, a flaker, hammer mill or refiner, to produce a lignocellulosic mixture having a moisture content of from about 1.5% to about 35%. An aqueous protein and diluent dispersion is prepared and diluted to a viscosity of less than about 100 centipoise (cps). The aqueous dispersion is added to the lignocellulosic mixture in an amount of about 1% to about 2% based on dry weight (wt.) lignocellulosic and can be about 1.5% aqueous protein and diluent dispersion by dry wt. lignocellulosic.

The aqueous protein and diluent dispersion wherein the diluent is in the form of starch and sugars wherein the wherein the ratio of starch to soy is about 1:1 to 0:1, and can be about 0.1:1 to about 2:1 starch to protein and the ratio of sugar to the soy plus starch can be about 0.5 parts sugar to about 1 part (soy plus starch) to about 2 parts sugar to 1 parts (soy plus starch).

Adhesives, binders and/or curatives are then added to the composite mixture in amounts of from about 1% to about 15% by dry wt. lignocellulosic and can be about from about 1% to 5% and may be about 1.5% by dry wt. lignocellulosic, and the composite mixture is further mixed in for example, a drum blender, shear-type blender, or tube-like blender, such as a blow-line and formed into a mat, which is cold pressed or pressed without heat. The cold pressed mat is then hot-pressed at temperatures of from about 150 degrees Celsius (° C.) to about 225° C. to effect curing of the composite structure. All of the amounts of chemicals used throughout the application are expressed in percentages based on actives.

In other aspects of the process, wherein the ratio of starch to soy is about 1:1 to 0:1, and can be 0.1:1 to about 2:1 starch to protein and the ratio of sugar to the soy plus starch can be about 0.5 parts sugar to about 1 part (soy plus starch), to about 2 parts sugar to 1 parts (soy plus starch).

In some aspects of the process, the protein can include, soy protein, blood meal, feather meal, keratin, gelatin, collagen, gluten, spimlina, casein, soy flour, wheat gluten, corn gluten, peanut flour, lupin flour, and egg whites. The protein source may be pretreated or modified to improve its solubility, dispersability and/or reactivity. Soy flour, soy concentrate and soy isolates can be used as the source of protein for the adhesive. One particularly useful source of protein for the current invention is soy flour (about 50 wt. % protein, dry basis). The present invention applies to aqueous protein and diluent dispersions regardless of the Protein Dispersability Index (PDI) of the soy flour used. The PDI is a means of comparing the solubility of a protein in water, and is widely used in the soybean product industry. Although the PDI is not critical in the current process a PDI above 70 is preferred. Soy flour has been found to be a good source of protein in the current process.

In some aspects of the current process, suitable starches are native starches and modified starches made from, e.g., potato, com, wheat, rice, peas etc., such as: acetylated degraded starch, alkyl succinic acid modified starch, oxidated starch, hydroxypropylated starch, cationic starch, amylopectin starch, high amylase acetylated starch, tapioka starch, native potato starch, native com starch, native wheat starch, native rice starch, and, native pea starch. These starches can be used with any of the proteins and sugars described in other aspects of the current process.

In some aspects of the process, the sugar can be, for example, molasses, glycerol, corn syrup and sucrose and the protein source can be soy flour, soy protein concentrates (SPC), or soy protein isolates (SPI).

In another aspect of the process, the adhesives, binders and/or curatives are added to the lignocellulosic mixture subsequent to the aqueous protein and diluent dispersion. For the purpose of this application, adhesives, binders and curatives are used interchangeably throughout.

In yet other aspects of the process, the aqueous protein and diluent dispersion is a soy flour/starch/molasses dispersion that is added to a lignocellulosic mixture; and wherein the ratio of starch to soy is about 1:1 to 0:1, and can be about 0.1:1 to about 2:1 starch to protein and the ratio of sugar to the soy plus starch can be about 0.5 parts sugar to about 1 part (soy plus starch) to about 2 parts sugar to about 1 part (soy plus starch). The adhesive, binder or curative can be added to the lignocellulosic mixture prior to, simultaneously with or subsequent to the aqueous protein and diluent dispersion or can be added as a combination thereof.

In one aspect of the current process, a lignocellulosic source is broken down into smaller pieces by, for example, a flaker, hammer mill, or refiner. Used in particle board, oriented strand board (OSB) and medium density fiber board (MDF) manufacturing.

In some aspects of the current process, the aqueous dispersion described in other aspects of the process can reduce tool and blade wear in manufacturing mills by at least 10%, can be reduced by at least 25%, can be reduced by at least 50% and may reduce tool and blade wear by about 65%. Tool wear and edge quality of blades, for example, on routers, saws and knives is evident when the aqueous protein and diluent dispersion is used in the manufacturing process of composite board as described above.

Adhesives

Composites are composed of multiple materials, typically a lignocellulosic material, such as wood or a type of fiber or type of filler that is held together by an adhesive. An adhesive used for composites may also be referred to as a binder or resin. The lignocellulosic material comprises the major part of the composite in a range from about 80% to about 99% by dry wt., can be in the range of from about 90% to 99% by dry wt. The adhesive portion comprises from about 1% to about 20% of the composite by dry wt., can be from about 1% to about 15%, 1% to about 10% by dry wt. lignocellulosic.

In the composites the lignocellulosic materials are held together or bonded together or glued together by an adhesive or binder, which are used interchangeably throughout the application. For many lignocellulosic composites the most common adhesives are urea-formaldehyde resins and phenol formaldehyde resins. Examples of suitable adhesives include but are not limited to pMDI, UF, MF, MUF, and PF. Preferred is isocyanate or pMDI.

Other additives may be included in an adhesive formulation such as extenders, viscosity modifiers, defoamers, diluents, catalysts, formaldehyde scavengers, biocides, and fillers.

The components of the adhesive formulation are generally combined in a suitable mixer and are stirred until a homogeneous mixture is obtained, but components may also be mixed in an application line, by co-spraying, or even in situ in the composite structure.

In one aspect of the current process the lignocellulosic material of the composite is wood, preferentially wood dust and particles and chips such as used in making particle board and wood fibers for making MDF.

To obtain good composite properties the adhesive should be applied uniformly to the lignocellulosic material and also be well distributed and evenly distributed throughout the lignocellulosic material. Those skilled in the art will be familiar with the means for obtaining proper mixing of the adhesive and lignocellulosic material. For example in the manufacturing of particle board it is common for the adhesive to be sprayed onto moving wood particles which are then further tumbled or mixed. The aqueous dispersion of the current process can be added to the lignocellulosic material prior to simultaneously with and/or subsequent to the adhesives, binders and/or curatives or can be a combination of thereof.

In some aspect of the current process, there is provided improved tool and blade wear in the manufacturing of the composite board, wherein there is provided a reduction in the tool and blade wear by at least 10%, can be a reduction by at least 25%, can be reduced by at least 50% and may be reduced by about 65%, while maintaining acceptable strength.

These and other embodiments are defined in the following Examples. It should be understood that these Examples are given by way of illustration only. Thus various modifications in addition to those shown and described herein will be apparent to those skilled in the art. Although the invention has been described with reference to particular means, materials and embodiments, it is to be understood that the invention is not limited to the particulars disclosed, and extends to all equivalents within the scope of the appended claims. All references cited in this application are incorporated herein in their entirety.

EXAMPLES

Example 1

Aqueous Dispersion Preparation and Composite Board

A composite manufacturing process was used as follows: 334 gram (g) of water was mixed with 360 g of blackstrap molasses (Imperial Sugar Co, Sugar Land, Tex.), 1 g of a commercial defoamer, Advantage® 1529, (Solenis LLC, Wilmington, Del.) and 1.5 g sodium meta bisulfite. To this mixture was slowly added 152 g soy flour, Prolia 200/90 (Cargill, Minnetonka, Minn.). The soy flour was thoroughly mixed in. To this mixture was slowly added 152 g corn starch, Casco Industrial (Ingredion Inc., Westchester, Ill.). The corn starch was thoroughly mixed in. The final solids content was about 50%.

In a second step, 100 parts of lignocellulosic material in the form of a wood furnish on a dry basis, mostly pine, in the form of particles, (such as used for making the face of particleboard) was placed in a Littleford Day shear-type mixer. The wood had a moisture content of about 6%. The mixer turned and flipped the wood as it stirred. While being stirred the wood was sprayed from above with 1.5 parts on a dry basis of the above described soy/starch/molasses mixture. The spraying was done over a period of about 1 minute. While still being stirred the wood was sprayed from above with 1.5 parts on a dry basis of methylene diphenyl diisocyanate (pMDI). The spraying was done over a period of about 1 minute and was followed by a minute of mixing the wood in the mixer. About 5500 g of face wood was treated in this manner.

A second batch of 100 parts of lignocellulosic material in the form of a wood furnish on a dry basis, mostly pine, in the form of particles, (such as used for making the core of particleboard) was placed in a Littleford Day shear-type mixer. The wood had a moisture content of about 1.5%. The mixer turned and flipped the wood as it stirred. While being stirred the wood was sprayed from above with 1.5 parts on a dry basis of the above described soy/starch/molasses mixture. The spraying was done over a period of about 1 minute. While still being stirred the wood was sprayed from above with 1.5 parts on a dry basis of pMDI. The spraying was done over a period of about 1 minute and was followed by a minute of mixing the wood in the blender. About 5300 g of core wood was treated in this manner.

The resulting mixture, 2995 g of the face lignocellulosic composition, was placed in a 34 inch by 34 inch frame and leveled. 2861 g of the core lignocellulosic composition was placed on top of the first layer and leveled. Another 2861 g of the core lignocellulosic composition was placed on the second layer and leveled. A final 2995 g of the face lignocellulosic composition was placed on the third layer and leveled. This layered lignocellulosic composition was pressed down by hand using a roughly 34"×34" board. The frame was then removed and the resulting structure was hot pressed to a ¾ inch thickness in an oil-heated 36"×36" Nordberg press being controlled by PressMAN software (Alberta Innovates, Edmonton, AB, Canada). The press conditions were 160° C., for 4 minutes.

Example 2

A composite manufacturing process was used as follows: 100 parts of lignocellulosic material in the form of a wood furnish on a dry basis, mostly pine, in the form of particles, (such as used for making the face of particleboard) was placed in a Littleford Day shear-type mixer. The wood had a moisture content of about 6%. The mixer turned and flipped the wood as it stirred. While being stirred the wood was sprayed from above with 5.7 parts to dry wood of deionized water. The spraying was done over a period of about 1 minute. While still being stirred the wood was sprayed from above with 1.5 parts on a dry basis of pMDI. The spraying was done over a period of about 1 minute and was followed by a minute of mixing the wood in the blender. About 5500 g of face wood was treated in this manner.

A second batch of 100 parts of lignocellulosic material in the form of a wood furnish on a dry basis, mostly pine, in the form of particles, (such as used for making the core of particleboard) was placed in a Littleford Day shear-type mixer. The wood had a moisture content of about 1.5%. The mixer turned and flipped the wood as it stirred. While being stirred the wood was sprayed from above with 6.1 parts to dry wood of deionized water. The spraying was done over a period of about 1 minute. While still being stirred the wood was sprayed from above with 1.5 parts on a dry basis of pMDI. The spraying was done over a period of about 1 minute and was followed by a minute of mixing the wood in the blender. About 5300 g of core wood was treated in this manner.

The resulting mixture, 2975 g of the face lignocellulosic composition was placed in a 34 inch by 34 inch frame and leveled. 2880 g of the core lignocellulosic composition was placed on top of the first layer and leveled. Another 2880 g of the core lignocellulosic composition was placed on the second layer and leveled. A final 2975 g of the face lignocellulosic composition was placed on the third layer and leveled. This layered lignocellulosic composition was pressed down by hand using a roughly 34"×34" board. The frame was then removed and the resulting structure was hot pressed to a ¾ inch thickness in an oil-heated 36"×36" Nordberg press being controlled by PressMAN software. The press conditions were 160° C., for 4 minutes.

Example 3

A composite manufacturing process was used as follows: 100 parts of lignocellulosic material in the form of a wood furnish on a dry basis, mostly pine, in the form of particles, (such as used for making the face of particleboard) was placed in a Littleford Day shear-type mixer. The wood had a moisture content of about 6%. The mixer turned and flipped the wood as it stirred. While being stirred the wood was sprayed from above with 12.8 parts on a dry basis of urea formaldehyde (UF) wood adhesive. This UF wood adhesive was a mixture of 88.3% UF resin, EcoBind (Hexion Inc., Columbus, Ohio) and 11.7% formaldehyde scavenger, which was a solution of 40% urea water. The spraying was done over a period of about 1 minute and was followed by a minute of mixing the wood in the blender. About 5500 g of face wood was treated in this manner.

A second batch of 100 parts of lignocellulosic material in the form of a wood furnish on a dry basis, mostly pine, in the form of particles, (such as used for making the core of particleboard) was placed in a Littleford Day shear-type mixer. The wood had a moisture content of about 1.5%. The mixer turned and flipped the wood as it stirred. While being stirred the wood was sprayed from above with 12.8 parts on a dry basis of urea formaldehyde (UF) wood adhesive, described above. The spraying was done over a period of about 1 minute and was followed by a minute of mixing the wood in the blender. About 5300 g of core wood was treated in this manner.

2986 g of the face lignocellulosic composition was placed in a 34 inch by 34 inch frame and leveled. 2892 g of the core lignocellulosic composition was placed on top of the first layer and leveled. Another 2892 g of the core lignocellulosic composition was placed on the second layer and leveled. A final 2986 g of the face lignocellulosic composition was placed on the third layer and leveled. This layered lignocellulosic composition was pressed down by hand using a roughly 34"×34" board. The frame was then removed and the resulting structure was hot pressed to a ¾ inch thickness in an oil-heated 36"×36" Nordberg press being controlled by PressMAN software. The press conditions were 160° C., for 4 minutes.

Each sample from Examples 1-3, after being hot pressed were cooled to room temperature and then placed in a controlled environment to maintain a constant moisture until they were cut and tested. Duplicate samples were made for each Example.

Router Blade Wear

Tool wear was measured as the average % loss in blade length on the cutting surface of a removable router blade. The router table used was a Bosch RA1181, and the cutting tool was an Amana RC-3110 insert router bit with replaceable blades (Amana, RCK-34).

One 30"×16" test piece was cut from each of the duplicate samples for Examples 1, 2 and 3. A previously unused blade was fastened into the router bit for routering both duplicate samples of example 1. Samples were repeatedly passed across the router bit until a combined roughly 900 sq.in. had been routered away from the duplicate samples of example 1. At the completion of the test, the blade was removed from the router bit, labeled, and set aside for microscopic measurements. Examples 2 and 3 were measured in the same manner as example 1. For each example, a previously unused blade was used. Blade wear was measured as the % of loss in blade length of the cutting surface. Blade images were captured using a ProScope HR2 microscope with the 200× lighted magnifier (Bodelin Technologies, Wilsonville, Oreg.), and blade length was measured on a computer monitor using a program called Screen Calipers, V4.0 (Iconico.com).

Each RCK-34 router blade is 1¼" high, while the lignocellulosic was only about ¾ " thick. Therefore, there was roughly ½ " of blade height than did not do any cutting. The measured blade length at that point established the starting blade length. Visual inspection identified the two points of maximum blade wear, which coincided with the top and bottom face layers of the lignocellulosic composite. The fourth measurement point coincides with the center of the core layer of the lignocellulosic composite. The % loss in blade length was calculated for the top face, center core, and bottom face layers compared to the upper portion of the router blade that did no cutting. These 3 numbers were averaged to obtain one composite value of the average blade wear for example 1. The average blade wear for example 1 was 0.64%.

The blades for Examples 2 and 3, were analyzed in the same manner as example 1, revealing average blade wear of 1.83% and 1.34%, respectively.

This shows that a lignocellulosic composite of comparable properties made with an adhesive system comprising UF resin and a formaldehyde scavenger reduced blade wear by only 27% compared to the lignocellulosic composite made with just MDI. Surprisingly, compared to lignocellulosic composites made with just MDI, adding the soy/starch/molasses mixture of the present invention along with the MDI reduced blade wear by a surprising 65%.

While the present invention has been described with respect to particular embodiments thereof, it is apparent that numerous other forms and modifications of this invention will be obvious to those skilled in the art. The appended claims should be construed to cover all such obvious forms and modifications which are within the true spirit and scope of the present invention.

The invention claimed is:

1. A process for improved tool and blade wear in the manufacture of a composite board comprising: adding to a lignocellulosic mixture an aqueous protein and diluent dispersion; and an adhesive, binder and/or curative to form a composite mixture; forming the composite mixture into a mat, pressing and curing the composite mixture to produce a composite board; wherein the adhesives, binders and/or curatives can be added to the lignocellulosic mixture prior to, simultaneously with, after the aqueous protein and diluent dispersion or a combination thereof; and wherein the diluent dispersion comprises starch and sugar.

2. The process of claim 1, wherein the aqueous protein and diluent dispersion comprises soy flour; starch; and sugar.

3. The process of claim 2, wherein the ratio of starch to soy is about 0:1 to about 2:1 and the ratio of sugar to the soy plus starch is from about 0.5 parts sugar to about 1 part (soy plus starch) to about 2 parts sugar to about 1 part (soy plus starch).

4. The process of claim 2, wherein the sugar is molasses.

5. The process of claim 1, wherein the adhesives, binders or curatives are added in an amount of from about 1% to about 20% by dry wt. lignocellulosic.

6. The process of claim 1, wherein the adhesive is selected from the group consisting of pMDI, UF, MF, MUF, PF, isocyanates, polyvinyl acetate dispersions, poly(ethylene vinylacetate) dispersions, vegetable glues, glues of animal origin, polyamides, polyamidoamine-epichlorohydrin resins, protein based glues (including soy flour based glues), gelatins based glues, and combinations thereof.

7. The process of claim 6 wherein the adhesive is polymeric 4,4'-methylene-bis(phenyl isocyanate) or urea formaldehyde based adhesives.

8. The process of claim 1, wherein tool and blade wear in manufacturing the composite board is reduced by at least 10% when compared with manufacturing the composite board without the aqueous protein and diluent dispersion; and an adhesive, binder and/or curative.

9. The process of claim 1, wherein the lignocellulosic mixture further comprises optional additives selected from extenders, viscosity modifiers, defoamers, diluents, catalysts, formaldehyde scavengers, biocides, and fillers.

10. The process of claim 5, wherein the adhesives, binders or curatives are added in an amount of from about 1% to about 10% by dry wt. lignocellulosic.

11. The process of claim 10, wherein the adhesives, binders or curatives are added in an amount of from about 1.5% to about 5% by dry wt. lignocellulosic.

12. The process of claim 1, wherein tool and blade wear in manufacturing the composite board is reduced by at least about 25% when compared with manufacturing the composite board without the aqueous protein and diluent dispersion; and an adhesive, binder and/or curative.

13. The process of claim 12, wherein tool and blade wear in manufacturing the composite board is reduced by at least about 50% when compared with manufacturing the composite board without the aqueous protein and diluent dispersion; and an adhesive, binder and/or curative.

14. The process of claim 13, wherein tool and blade wear in manufacturing the composite board is by at least about 65% when compared with manufacturing the composite board without the aqueous protein and diluent dispersion; and an adhesive, binder and/or curative.

* * * * *